United States Patent
Kimura et al.

(10) Patent No.: US 6,752,612 B2
(45) Date of Patent: Jun. 22, 2004

(54) MOLD DEVICE FOR INJECTION MOLDING OF SYNTHETIC RESIN

(75) Inventors: Naoyoshi Kimura, Tokyo (JP); Fumio Takahashi, Tokyo (JP); Masahiko Yamaki, Chiba (JP); Akihiko Imagawa, Aichi (JP); Mitsuharu Mikawa, Aichi (JP)

(73) Assignee: Ono Sangyo Co., Ltd., Tokyo (JP)

( * ) Notice: Subject to any disclaimer, the term of this patent is extended or adjusted under 35 U.S.C. 154(b) by 34 days.

(21) Appl. No.: 10/033,217

(22) Filed: Dec. 28, 2001

(65) Prior Publication Data

US 2002/0094354 A1 Jul. 18, 2002

(30) Foreign Application Priority Data

Jan. 17, 2001 (JP) .......................................... 2001-009119
Jan. 17, 2001 (JP) .......................................... 2001-009120

(51) Int. Cl.$^7$ ............................................. B29C 45/78
(52) U.S. Cl. ............. 425/143; 264/328.14; 264/328.16; 425/144; 425/548; 425/552; 425/577; 425/DIG. 58
(58) Field of Search ................................. 425/143, 144, 425/548, 552, 577, DIG. 58, 812, 215; 264/328.14, 328.16

(56) References Cited

U.S. PATENT DOCUMENTS

| | | | | |
|---|---|---|---|---|
| 2,994,921 A | * | 8/1961 | Hultgren .............. | 425/DIG. 58 |
| 4,201,742 A | * | 5/1980 | Hendry ........................ | 425/552 |
| 4,820,149 A | * | 4/1989 | Hatakeyama et al. ....... | 425/577 |
| 4,995,445 A | * | 2/1991 | Shigyo ....................... | 425/812 |
| 5,851,558 A | * | 12/1998 | Atake ......................... | 425/577 |

FOREIGN PATENT DOCUMENTS

| | | |
|---|---|---|
| JP | 45-22020 | 7/1970 |
| JP | 51-22759 | 2/1976 |
| JP | 55-109639 | 8/1980 |
| JP | 57-165229 | 10/1982 |
| JP | 64-042217 | 2/1989 |
| JP | 04-265720 | 9/1992 |
| JP | 2001-018229 | 1/2001 |
| JP | 61-079614 | 4/2001 |

* cited by examiner

Primary Examiner—Tim Heitbrink
(74) Attorney, Agent, or Firm—Katten Muchin Zavis Rosenman

(57) ABSTRACT

In a mold device for injection molding of synthetic resin having a cavity surface alternately heated and cooled and a bottoming structure for producing a product having a bored portion like a window, a bottoming portion for the production of a product having a bored portion is provided on a parting surface of the mold and a vacant space is provided in the bottoming portion. Thus, the contact area of the bottoming portion is reduced and a contact pressure of the bottoming portion and thermal strain due to a temperature difference between the cavity side mold and core side mold are reduced, so that it is possible to prevent occurrence of crack in a portion located immediately outside the window of the product. In a mold device for injection molding of synthetic resin having a cavity surface alternately heated and cooled and a slide structure, a mold base and a slide cavity block arranged in the slide core provided in the mold base are separately thermally controlled so that it is possible to prevent galling between the mold base and the slide core of the slide structure.

4 Claims, 3 Drawing Sheets

Cavity side mold

Core side mold

Cavity side mold

Core side mold

MOLD DEVICE FOR INJECTION MOLDING OF SYNTHETIC RESIN

BACKGROUND OF THE INVENTION

1. Field of the Invention

The present invention relates to a mold device for injection molding of synthetic resin having a cavity surface which is alternately heated and cooled.

2. Description of the Related Art

In injection molding of thermoplastics, when the melted resin is filled into a mold cavity having the surface thereof kept at a high temperature, enhancement of quality of the injection molding can be expected in that, for example, the transferring characteristics from the cavity surface to the molded material surface is good, and any noticeable weld line does not appear. Therefore, a heat-cycle method in which the cavity surface of the mold is heated during the filling of the melted resin into the cavity is put into practical use.

As a method for heating or cooling the cavity surface for a short period of time, for example, a method for heating by heated air is disclosed in Japanese Examined Patent Publication No. 22020/1970; a combination of a heating method by an electric heater and a cooling method by cooled water is disclosed in Japanese Patent Laid-open Publication No. 22759/1976; a method for heating by high frequency induction is disclosed in Japanese Patent Laid-open Publication No. 109639/1980; a method for heating by supplying steam into a cavity is disclosed in Japanese Patent Laid-open Publication No. 165229/1982; a method for heating by interposing a heated plate between a cavity and a core is disclosed in Japanese Patent Laid-open Publication No. 79614/1986; a method for heating by halogen bulb is disclosed in Japanese Patent Laid-open Publication No. 42217/1989; and a method for heating a mold surface by an electrically conducting layer is disclosed in Japanese Patent Laid-open Publication No. 265720/1992.

The present inventors have developed a heat-cycle molding method for heating and cooling a cavity surface for a short period of time by a combination of use of steam and use of water and an apparatus for implementing this method as disclosed in, for example, Japanese Patent Application No. 375069/1999. In this heat-cycle molding method, the cavity surface is heated and cooled. Since the heating and cooling are frequently repeated, a careful measure against the thermal strain is provided for the mold construction.

Namely, the heating and cooling channels for heating and cooling the surface of a cavity block is designed in a manner such that a distance between every neighboring channels and a distance between the channels and the cavity surface are designed as appropriate so as to prevent fatigue of the respective members. As the surface of a cavity carved in the cavity block is heated and cooled, space between the cavity block and the mold base is appropriately designed in consideration of a thermal expansion of the cavity block. Further, a corner portion of a hole of the mold base in which the cavity block is housed is rounded at an appropriate curvature.

In such a mold construction, a suitable heat insulator is interposed between the cavity block and the mold base in order to prevent occurrence of a problem such as hampering the rise of temperature of the cavity block due to heat transmission from the cavity block to the mold base. The heat insulator provides some advantages in addition to the above-described effect. That is to say, the heat insulator inserted on the side face of the cavity block is useful for mitigating any thermal strain occurring between the cavity block and the mold base. Further, the heat insulator inserted on the bottom face of the cavity block is effective for reducing contact pressure occurring between respective thermally expanding cavity blocks in the cavity and the core.

In order to produce a molded product having a bored portion like a window, there has been proposed a mold having a bottoming structure therein. Namely, as shown in FIGS. 1 and 2, a bottoming portion 5a is provided on a parting surface of a cavity side mold or a core side mold defining a cavity 1.

Further, in order to produce a molded product having a window, a lattice, or an inverted taper portion at its side portion, there has been proposed a mold having a slide structure. This slide structure consists of a slide core and a slide cavity block provided inside the slide core. The slide cavity block is provided with heating and cooling channels similar to the mold base. For the purpose of avoiding problems caused by either thermal expansion or thermal shrinkage of the mold base and cavity block, there is usually provided a clearance for permitting of thermal expansion.

Nevertheless, in the described structures of the mold according to the prior art, unexpected problems occurred as described hereinbelow.

The following first problem occurs in the above-described first mold structure, i.e., in the bottoming structure of the mold for producing the molded product having the bored portion like a window. When at least one of the cavity surfaces 2 and 3 of the cavity side mold and core side mold, in which the bottoming portion 5a is provided on a parting surface, is subjected to repeated heating and cooling, a crack 9 appears in the mold at a portion located immediately outside the bottoming portion 5a for forming the window, and accordingly a heating or cooling medium oozes out of the heating and cooling channel 4 adjacent to the cavity surface via the crack 9 toward the exterior of the mold.

The following second problem occurs in the above-described second mold structure according to the prior art, i.e., in the slide structure of the mold for producing a molded product having a window, a lattice, an inverted taper portion, or the like in the side portion. Even if a clearance for the thermal expansion or shrinkage of the mold base and the cavity block of the side structure is provided between the slide core and the mold base to avoid the problem relating to the thermal expansion and shrinkage, there is still a problem of galling caused by the thermal expansion.

Therefore, a first object of the present invention is to prevent occurrence of any crack at a portion located immediately outside the bottoming portion of the mold, in a mold device for injection molding of synthetic resin having a cavity surface alternately heated and cooled and a bottoming portion enabling production of a product having a bored portion like a window.

A second object of the present invention is to prevent occurrence of any galling between the slide core and the mold base due to thermal expansion, in a mold device for injection molding of synthetic resin having a cavity surface alternately heated and cooled and a slide structure.

SUMMARY OF THE INVENTION

One feature of the present invention resides in that, in a mold device for injection molding of synthetic resin having a cavity surface alternately heated and cooled, a bottoming portion for producing a product having a bored portion is provided on a parting surface of the mold, and a vacant space is also provided in the bottoming portion for reducing contact area. Thus, the contact area of the bottoming portion is small so that it is possible to reduce a contact pressure of the bottoming portion and thermal strain due to a temperature difference between the cavity side mold and the core side mold, and to prevent occurrence of any crack in the mold. The above-mentioned vacant space should preferably be connected to a gas vent.

Another feature of the present invention resides in that, in a mold device for injection molding of synthetic resin having a cavity surface alternately heated and cooled, the mold base, a slide core provided in the mold base, and a slide cavity block in the slide core are separately thermally controlled.

A further feature of the present invention resides in that, in a mold device for injection molding of synthetic resin having a cavity surface alternately heated and cooled, clearances are provided between a slide core, which is provided in the mold base and has a slide cavity block, and guide rails arranged on opposite side portions of the slide core, and a center rail is provided in the central position of the slide core for guiding the slide core.

In accordance with the above-described constitution of the mold device for injection molding of synthetic resin having a cavity surface alternately heated and cooled, it is possible to prevent galling between the mold base and the slide core of the slide structure.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 3:
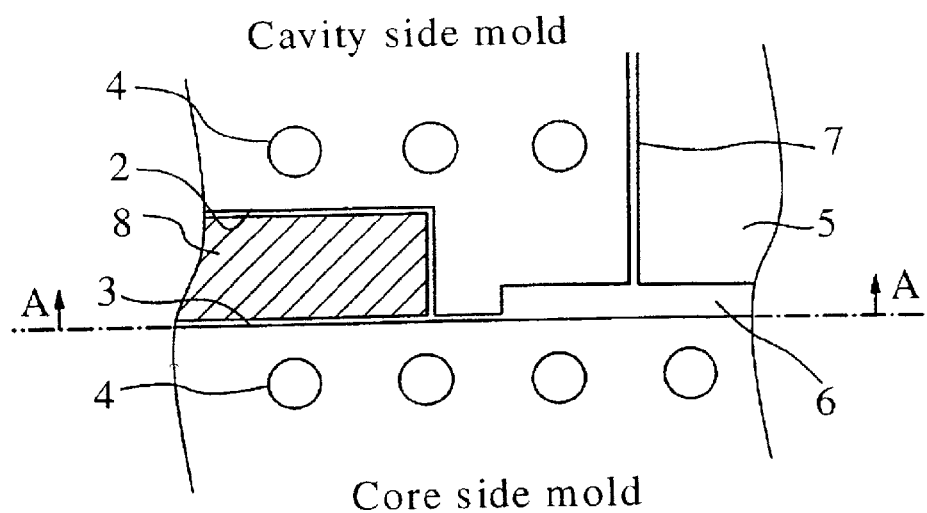
FIG. 3 is a front elevational cross-sectional view of a main portion (a portion along the line A—A of FIG. 4) of a bottoming structure of a cavity of a mold device for injection molding of synthetic resin according to a first embodiment of the present invention.

As illustrated in FIG. 3, a mold device consists of a cavity side mold and a core side mold. A cavity 1 is formed in the cavity side mold. Adjacent to the cavity surfaces 2 and 3 of the cavity side mold and core side mold, there are provided heating and cooling channels 4 in which heating medium and cooling medium flow alternately and repeatedly. In the present embodiment, the heating and cooling channels 4 are arranged in respect to the cavity side mold and core side mold. However, the heating and cooling channels 4 can be arranged in only one of the molds.

A bottoming portion 5 for producing a molded product having a bored portion like a window is provided on the parting surface of the cavity side mold. The bottoming portion 5 is provided with a vacant space 6; therefore, only an outer peripheral portion of the bottoming portion 5 forms a contact surface (a parting surface) with the core side mold. The vacant space 6 is connected to gas vents 7.

The operation of the mold device of the present embodiment will be described below.

When either the cavity side mold or the core side mold is moved toward another to clamp the mold device, a parting surface of the bottoming portion 5 in the cavity side mold is pressed against a parting surface of the core side mold. While melted resin is poured and filled into the cavity 1, a heating medium is supplied into the heating and cooling channels 4 and the cavity surfaces 2 and 3 are heated. After completion of filling, a cooling medium is supplied into the heating and cooling channels 4 and melted resin is solidified into a molded product 8.

While the cavity surfaces 2 and 3 are heated and cooled, an outer portion of the mold located outside the bottoming portion 5 is freely expanded and shrunk.

Figure 1:
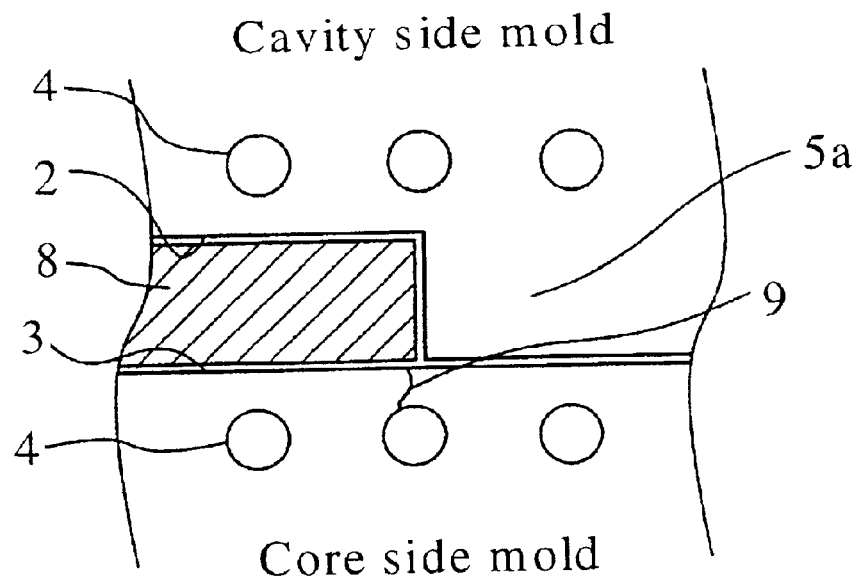
FIG. 1 is a front elevational cross-sectional view of a main portion (a portion along the line B—B of FIG. 2) of a bottoming structure of a mold device for injection molding of synthetic resin according to the prior art.
Figure 2:
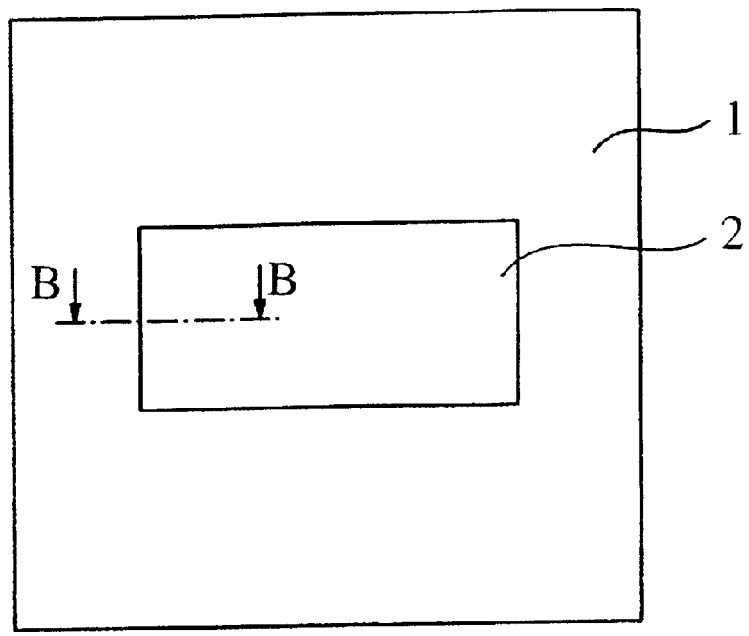
FIG. 2 is a view illustrating a parting surface of the cavity side mold shown in FIG. 1.

However, as illustrated in FIGS. 1 and 2, when no vacant space is provided in the bottoming portion 5a, a portion to become a window is restrained by the bottoming portion 5a; therefore, a strain appears in an outer portion immediately outside the bottoming portion 5a to result in occurrence of a crack. It is considered that restraint on the portion to become a window by the bottoming portion 5a consists of a contact pressure by the bottoming portion 5a and a thermal strain due to a temperature difference between the cavity side mold and the core side mold.

Figure 4:
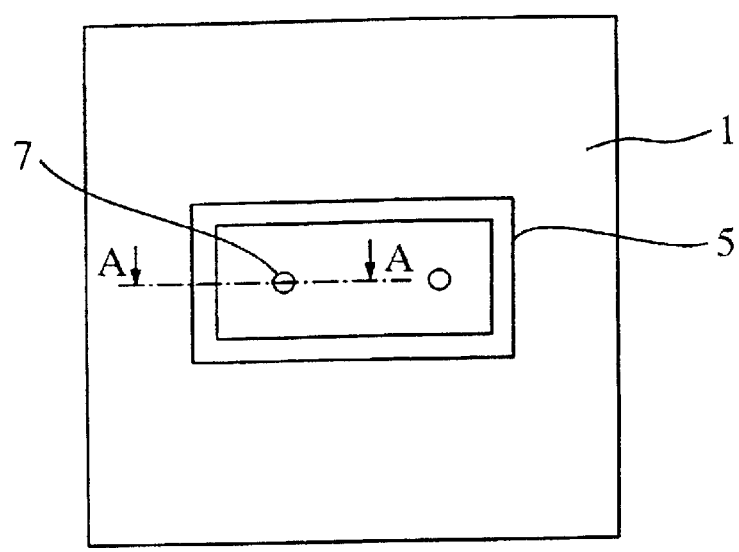
FIG. 4 is a view illustrating a parting surface of the cavity side mold shown in FIG. 3.

In the present invention, as illustrated in FIGS. 3 and 4, the vacant space 6 is provided in the bottoming portion 5. Thus, the contact pressure by the bottoming portion 5 and the thermal strain due to the temperature difference between the cavity side mold and core side mold are both reduced and it is possible to prevent occurrence of a crack. Gas generating from the melted resin can be vented toward outside from the gas vents 7 connected to the vacant space 6 in the bottoming portion 5.

It should be noted that it is possible to adopt a construction in which a bottoming portion is provided in the core side mold instead of the cavity side mold. In that case, a parting surface of the bottoming portion of the core side mold is pressed against a parting surface of the cavity side mold during the clamping of the mold device.

The second embodiment of the present invention will be described hereinbelow with reference to the drawings.

Figure 5:
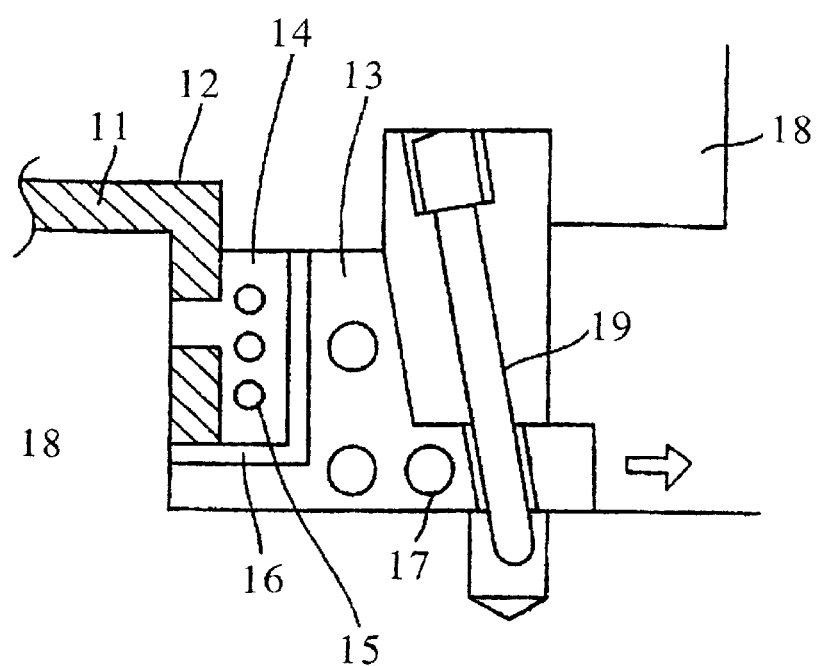
FIG. 5 is a front elevation of a slide structure provided for a mold device for injection molding of synthetic resin according to a second embodiment of the present invention.
Figure 6:
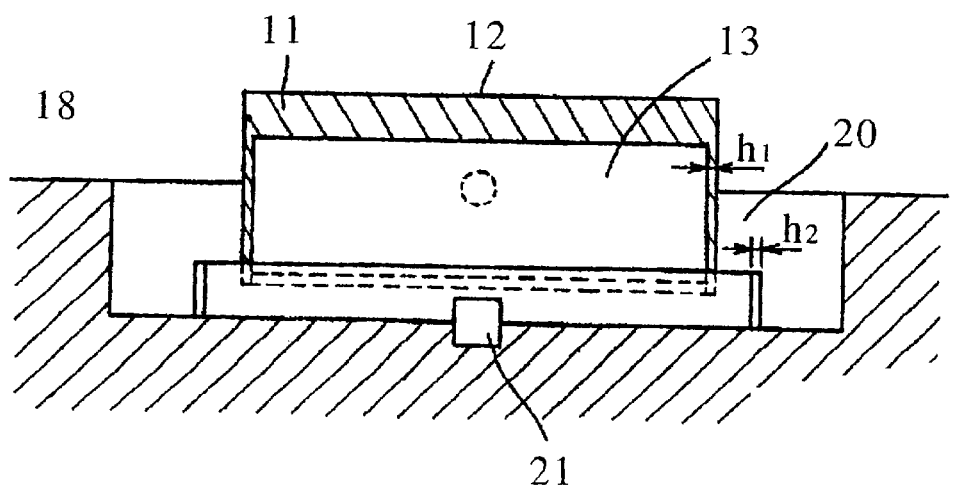
FIG. 6 is a side elevation of FIG. 5.

FIG. 5 is a front elevation of a slide structure of a mold device for injection molding of synthetic resin according to the second embodiment of the present invention. FIG. 6 is a side elevation of FIG. 5.

Referring to FIGS. 5 and 6, a slide core 13 is provided beside the cavity 12 of mold in which a molded product 11 is produced. A slide cavity block 14 is provided inside of the slide core 13. There are provided heating and cooling channels 15 for permitting a heating medium and a cooling medium to alternately and repeatedly flow therein, at a portion of the slide cavity block 14 adjacent to the cavity surface. There is provided a thermal insulating portion 16 which is formed from either a ditch or an insulating material between the slide cavity block 14 and the slide core 13. Further, in the slide core 13, there are provided channels 17 in which a cooling medium constantly flows.

Between the slide core 13 and a mold base 18, there is provided a clearance h1 for thermal expansion which appears during the injection molding. The slide core 13 is moved back and forth along guide rails 20 provided on opposite sides of the slide core 13, when an inclined pin 19 moves up and down together with the mold base 18. In FIGS. 5 and 6, heating and cooling channels provided in the mold base 18 for permitting a heating medium and a cooling medium to alternately and repeatedly flow therein are not shown for brevity's sake.

In injection molding with such a mold, heating and cooling are alternately repeated every short period of time and a temperature of each portion of the mold fluctuates, differing from an ordinary injection molding in which the temperature of an injection mold is kept approximately constant. Thus, unexpected galling may occur between the slide core and the mold base. Therefore, a construction described below is adopted in the present embodiment.

In the present embodiment, the mold base 18 and the slide cavity block 14 in the slide core 13 in the mold base are separately subjected to a thermal controlling operation. For example, if the slide cavity block 14 and the mold base 18 are thermally controlled by the same thermal controller, the temperature of the slide cavity block 14 will rise and fall more quickly than that of the mold base 18 to result in causing an unexpected change of the clearance h1 between the slide core 13 and the mold base 18. However, the mold base 18 and the slide core 13 are separately thermally controlled in the present embodiment, so that it is possible to prevent the above-described fluctuation of the clearance h1. It should be understood that the mold base 18 can comprise another slide core having another slide cavity block.

Further, in the present embodiment, as illustrated in FIG. 6, in order to obtain an equal arrangement of left clearances h1 and right clearances h1 between the slide core 13 and the mold base 18, clearances h2 are arranged between the slide core 13 and the guide rails 20, and the slide core 13 is constructed so as to be able to move along a central rail 21 arranged in its central portion.

In the foregoing respective embodiments of the present invention, the heating medium may be any one of saturated steam, over-heated steam, pressurized water, hot water, and oil. Further, cooling water and oil may be used as the cooling medium.

Although the heating and cooling mediums are used for heating and cooling the mold in the above-described respective embodiments, the present invention is not limited in these embodiments. Thus, for example, the heating or cooling medium can be replaced with a different kind of heating or cooling measure such as an electric heater.

Raw material resins molded by the mold according to the present invention may be amorphous polymer resin such as polyvinyl chloride (resin compounds including rigid resin and soft resin), acrylic ester resin (resin compounds containing acrylic acid, methacrylic acid, and so on as an acid, and also containing methyl group, ethyl group, and so on as an alkyl group), polystyrene (resin compounds including general purpose type, high impact resistant type, and so on), acrylonitrile-styrene resin, acrylonitrile-butadiene-styrene resin, modified polyphenylene oxide, polycarbonate, polysulfone, polyarylate, polyether imide, polyether sulfone, and so on; crystalline polymer such as polyethylene (resin compounds including low density type, linear low density type, medium density type, high density type, and so on), polypropylene (such as homopolymer, random polymer, block polymer, and so on), polybutene-1, polymethylpentene-1, polyfluorocarbon (polyvinylidene fluoride, and so on), polyoxymethylene, polyamide (6, 66, and so on), terephthalic acid ester resin (polyethylene terephthalate, polybutylene terephthalate, and so on), polyphenylene sulfide, polyether ether ketone, polyether ketone, polyimide, and so on; liquid crystal polymer (aromatic polyester, aromatic polyester amide, and so on); thermosetting resin such as epoxy resin, melamine resin, phenolic resin, urea resin, unsaturated polyester resin, polyurethane, silicone resin, and alkyd resin; and alloys and filler (including particle filler such as talc, and so on and fiber material such as glass fiber, and so on) and compounds of the above resins.

Further, a molding method to which the mold according to the present invention can be applied includes, in addition to an ordinary injection molding, injection-compression molding, local oscillation pressurizing method, gas-press method, gas-assist method, hollow molding, sandwiching molding, two-color molding, in-mold method, push-pull molding, high-speed injection molding, and so on.

While preferred embodiments of the present invention have been described using specific terms, such description is for illustrative purposes only, and it is to be understood that changes and variations may be made without departing from the spirit or scope of the following claims.

What is claimed is:

1. A mold device for injection molding of synthetic resin having a cavity surface alternately heated and cooled, comprising;

a mold base, a slide core provided in said mold base, and a slide cavity block provided in said slide core;

said mold base, said slide core, and said slide cavity block being separately thermally controlled.

2. The mold device for injection molding of synthetic resin according to claim 1, further comprising guide rails and a central rail for guiding said slide core, wherein a clearance is provided between said slide core and said guide rails arranged on opposite sides of said slide core, and said central rail is arranged in the central position of said slide core.

3. The mold device for injection molding of synthetic resin according to claim 1, wherein said mold base and said slide cavity block are provided with heating and cooling channels for permitting heating medium and cooling medium to alternately and repeatedly flow therein.

4. The mold device for injection molding of synthetic resin according to claim 2, wherein said mold base and said slide cavity block are provided with heating and cooling channels for permitting heating medium and cooling medium to alternately and repeatedly flow therein.

* * * * *